B. A. BROOKS.
PREPARATION OF PRINTING SURFACES.
APPLICATION FILED MAR. 12, 1907.
964,205.
Patented July 12, 1910.
4 SHEETS—SHEET 2.
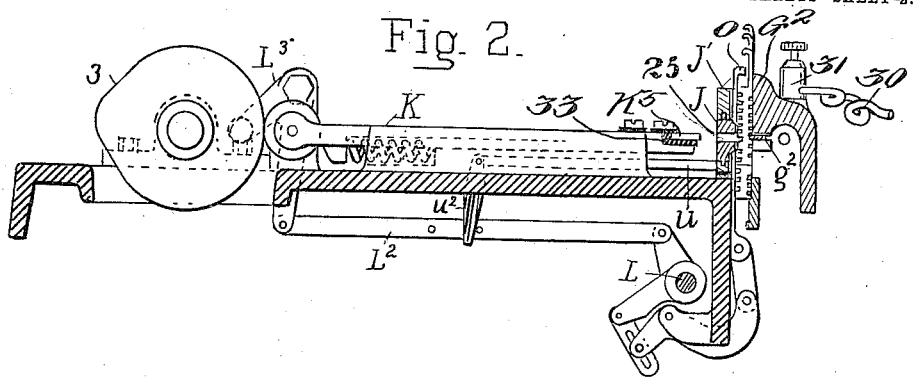
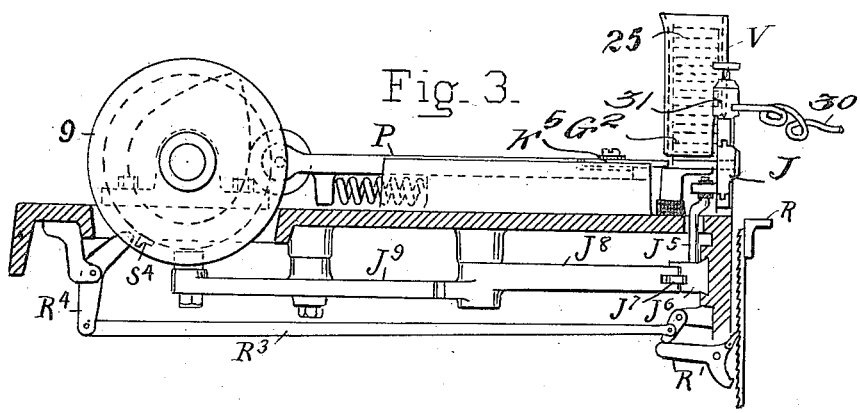
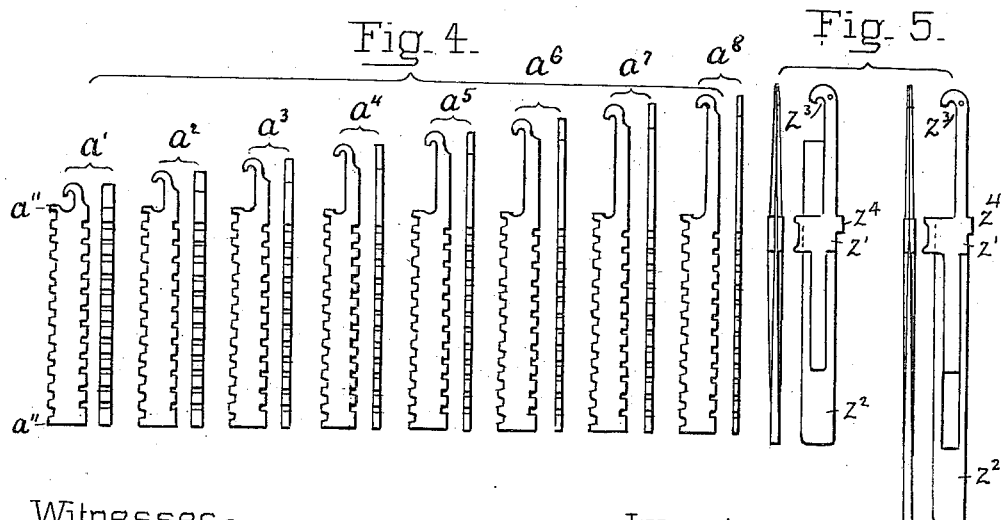

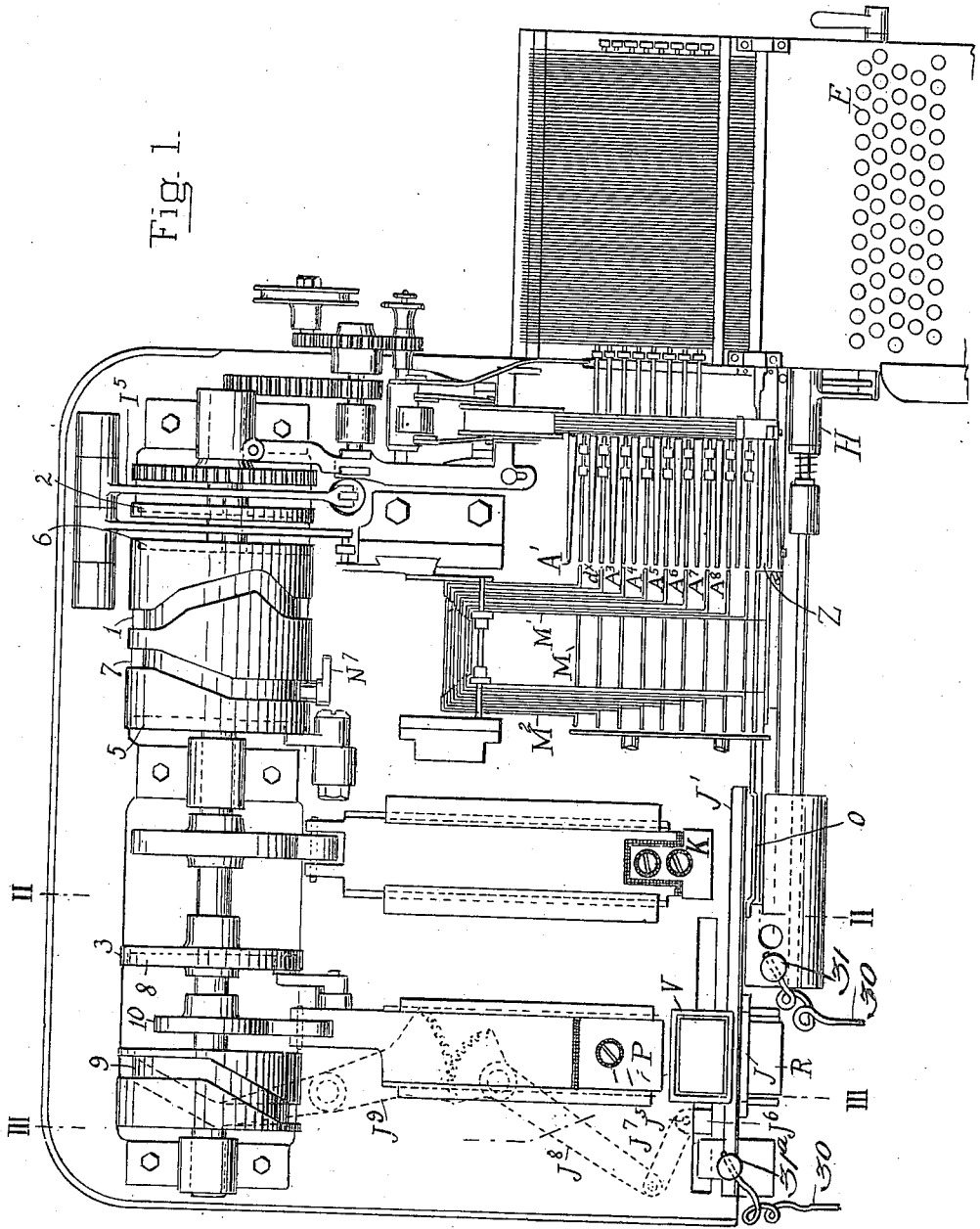

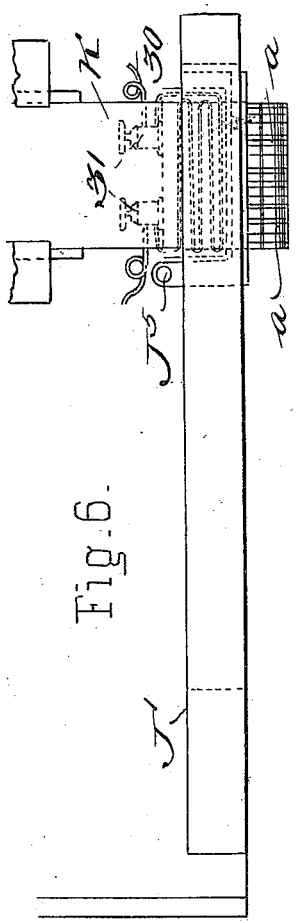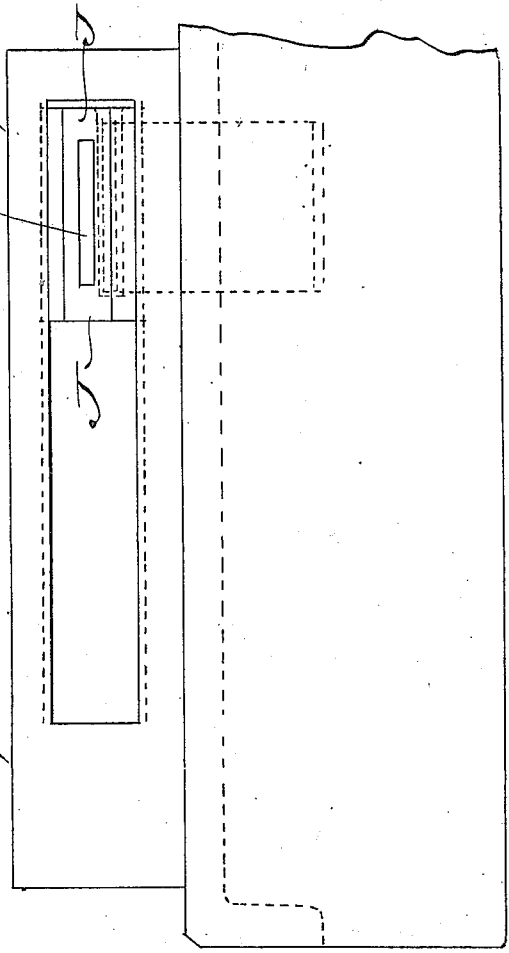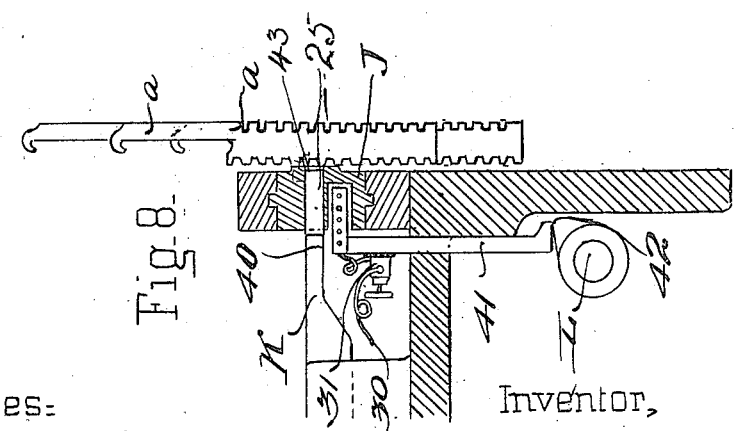

B. A. BROOKS.
PREPARATION OF PRINTING SURFACES.
APPLICATION FILED MAR. 12, 1907.

964,205.

Patented July 12, 1910.
4 SHEETS—SHEET 4.

Fig. 9

Fig. 10

Witnesses:
Samuel W. Balch
James T. Lane

Inventor,
Byron A. Brooks

UNITED STATES PATENT OFFICE.

BYRON A. BROOKS, OF NEW YORK, N. Y., ASSIGNOR TO BANDOTYPE COMPANY, A CORPORATION OF NEW YORK.

PREPARATION OF PRINTING-SURFACES.

964,205. Specification of Letters Patent. Patented July 12, 1910.

Application filed March 12, 1907. Serial No. 361,923.

*To all whom it may concern:*

Be it known that I, BYRON A. BROOKS, a citizen of the United States of America, and a resident of Brooklyn, in the city of New York, county of Kings, and State of New York, have invented certain new and useful Improvements in Apparatus for the Preparation of Printing-Surfaces, of which the following is a specification.

This invention relates to improvements in apparatus for the preparation of printing surfaces, and it consists in certain novel processes and combination of parts particularly pointed out in the claims concluding this specification.

In so far as my invention relates to novel apparatus, it will be understood that various modifications and changes may be made in the apparatus described, which is the form of embodiment of my invention which is at present preferred by me, and that in so far as my invention relates to novel processes, any suitable means may be employed for carrying out the same.

In my application Serial No. 268,773 I have shown an improved apparatus adapted especially for the preparation of planographic printing surfaces. The present invention while relating to a machine embodying many features similar to those described in that application, differs therefrom in that instead of relating to planographic printing it appertains to the preparation of printing surfaces other than planographic surfaces, and further differs in that it involves the use of electrical means in the preparation of the surfaces. That is to say, in the present instance I have in view the practice of electrically heating the type bars, so that when brought into contact with the line blocks the heated surface of the types will make an impression upon the relatively softer block, thus producing a matrix; or, I may form the type bars as matrix type, so that when heated by the electric current raised types will be formed upon the block instead of the depressed type; or, I may first lead the current through the soft line blocks so that the metal is melted to run into the matrix type bars.

A further object of my invention is to dispense with the melting pot in linotype and similar machines and also gas burners usually employed in such machines with the resultant difficulty of keeping the metal at uniform temperature. By this means I also dispense with the heat and fumes attendant in the use of such burners. As it is the practice to remelt linotype bars after they have been used I construct my mechanism with reference to the use of such bars, or ordinary blank bars of type metal. In place of the melting pot usually employed containing a large quantity of metal which must all be heated to the proper degree and from which a portion is ejected a plunger or pump at each cast, I use a small plate or box heated by a current of electricity upon which, or into which, a metal bar is placed and heated or fused and then ejected from the melting box into the mold and pressed against the face of a matrix type by which a cast of a new linotype bar is made containing the characters opposed by the types. By this means also I avoid overheating the body of metal as in a melting pot. The heat produced by the electric current is practically uniform and self-regulating so that the portion of metal subjected to it is not overheated, no matter how long it remains in the melting box and the quantity of metal in the melting box remains practically uniform as a new bar or slug is inserted by the same operation by which the bar is cast. By this means both the metal and heat are economized as only sufficient is employed to cast one slug or bar at a time. It is evident that where an old linotype bar is used it must be entirely remelted in order to cast a new one. In case of its being necessary to change the size of the linotypes to be cast it is only necessary to change the size of the bars which are fed into the melting box to correspond with the size of the mold. In practice a small quantity of metal is left in the melting box to insure sufficient quantity to fill the mold. After the cast the mold is removed with the type bar by automatic means and a new slug inserted in the melting box where it remains until the operation is completed by casting a new bar. All these operations follow in proper sequence by the operation of the cams automatically as shown.

In the operation above described, wherein the plunger acting upon a solid bar ejects the molten metal from the melting box and into the mold, it will be observed that as the plunger is retracted a solid bar is left in the melting box and before this bar is melted sufficiently to flow, the plunger in its retractive movement has passed the magazine, permitting a solid bar from the latter to drop down in front of the casting box thereby closing the front of the box against the backward flow of metal.

In the embodiment of the invention herein disclosed I adopt for the assembly of the type-bars—the types being of any approved form as raised types—their justification, presentation at the printing point and removal therefrom and distribution, the mechanism set forth in Letters Patent of the United States No. 506,198, granted October 3, 1893, for line-casting machine, on application of Wilbur Stephen Scudder, whereby similar operations are performed upon matrix-bars and the bars are brought to the casting point in the same manner as the type-bars are herein brought to the printing position. As no modification is necessary whatever in the mechanism required for the above enumerated operations, they are not herein illustrated in detail, and reference is hereby made to the specifications and drawings of the above patent for such detailed illustration and description as may be necessary for a complete understanding of such parts of the mechanism of the machine in which I have embodied my invention.

Referring now to the accompanying sheets of drawings, which form a part of this application—Figure 1 is a plan view of a machine embodying my invention, omitting however, the guide-rod bearings of the guide-rods which support the pusher-plate of the distributing mechanism. Fig. 2 is a cross-section on the line II—II of Fig. 1, showing the mechanism for inking and printing. Fig. 3 is a section on the line III—III of Fig. 1, showing the mechanism for feeding and discharging the line blocks. Fig. 4 is a face and edge view respectively of each of the type-bars which compose the series used in the machine. Fig. 5 is an edge and face view of one of the spacers, represented extended at the left, and at the right represented with the lower section pushed up into the upper one to enlarge the space produced by the spacer. Fig. 6 is a top plan view showing the arrangement of the electrical heating apparatus in connection with the invention. Fig. 7 is a plan view of the block carrier. Fig. 8 is a vertical sectional view showing the electric heater in operative position relative to the type bar and molding mechanism. Fig. 9 is a vertical sectional view of a modification. Fig. 10 is an enlarged detail view of a portion of Fig. 9.

The machine as illustrated is arranged for printing ninety-six different characters grouped in eight groups of twelve each according to width, all the characters in any group being of the same width and placed on the same type-bar. There are therefore eight species of type-bars $a'$ to $a^8$ inclusive. The characters for each group are so selected that all twelve in any group may be of the same width without departing appreciably from standard proportions. Each bar has a hook $a^{10}$ differing in length from the hook of any other species. Each bar has on its rear edge eight alining notches $a^9$ corresponding in number and position to the relief type on the front edge. The faces of the relief type are at the front edges of the bar, the types being formed by cutting away the face around and between adjacent types. The end types of each bar are preferably not placed at the extreme ends of the bar, but instead they are set a little back from the ends, and projections $a''$ are left standing for convenience in leveling bars.

The spacer is composed of two sections $z'$, $z^2$ each wedge-shaped. The upper section has a hook $z^3$ and on its rear edge a lug $z^4$. The two sections are combined for joint operation in the manner set forth in United States Letters Patent No. 494,899, granted April 4, 1893, to Wilbur Stephen Scudder, except that the upper section is cut back at the printing level, and the lower section is made somewhat narrower than the upper section, the face being set back particularly along that portion which may come at the printing level, so that both sections will lie below the type faces at the printing level for spacing the words.

The magazine delivery mechanism and keyboard is constructed in accordance with the above Patent No. 506,198, and only the principal parts will be pointed out, the same reference characters as in the patent being adopted. The magazine for containing a supply of type-bars and spacers is divided into eight chambers $A'$ to $A^8$, and a spacer chamber Z. In the upper part of the magazine and extending lengthwise of each chamber is a supporting guide-wire $d^x$ upon which the type-bars and spacers hang by their hooks. On manipulation of the keys E the type-bars and spacers are delivered from the magazine, and suitably assembled in the line carriage H, then through the operation of cam 1, they are transferred along the raceway, first to the justifier, described in detail in the above mentioned patent, by which the lower sections of the spacers are lifted to effect justification. The justifier is a horizontal shoe which underlies the assembled line of type-bars when in the raceway alongside of the magazine. A cam 2 operating through a lever $I^5$ lifts the shoe to effect justification.

The line blocks 25 which form matrices are placed in a magazine V from the bottom of which they are transferred to a block carrier J having therein a space or mold 43 by an ejector P actuated by the cam 10. The block carrier is then shifted lengthwise of a guide bar J' to the position by a cam 9. A finger $J^5$ depending from the block carrier engages a slide $J^6$, which derives its motion from the cam 9 through a link $J^7$, pivoted lever $J^8$ engaging through toothed sectors with another lever $J^9$ which carries a roller stud engaging with the cam.

When the block is shifted to the position to receive impression from the type bars, it is located substantially as is shown in Fig. 2; that is, by the cam 3 pressing the slide K against the rear edge of the block, and the formation of the type is accomplished as follows:

An electric current is led from a suitable source of supply through the wire 30, the binding post 31 and thence through the alining bar $g^2$ to the type bars. As the slide K moves forward and pushes the line block against the edges of the type bars a circuit is formed through the type bars, the line block and the end portion $K^5$ of the slide K, such end portion being insulated as at 33 from the rest of the slide. The current flowing in this manner heats the type bars and the latter being in contact with the line block, when the circuit is closed as described, the current passes through the type bars, the line block and through a suitable path back to the source of supply through the wire $31^a$, thus completing its circuit. If desired, instead of forming the type bars with raised faces and employing the line block as a matrix, I may form the type bars with depressed type faces and thereby heat the line blocks to a suitable point of melting to flow into the depressed or matrix types and form raised characters on the line blocks. In Figs. 6, 7 and 8 I have shown a modification of the invention. In such instance I employ an electric heater 40 carried by the stem 41 moved to and from the line block 25, lying in a mold 43 by the cam 42 carried on the shaft L. When the slide K pushes the line block into contact with the face of the type bars, the heater is raised to a point beneath the block and the latter suitably heated or fused to receive the impression from the type bars.

Another modification of the above described apparatus which I may employ is shown in Fig. 9. This consists in feeding the line block into a melting box or crucible and melting the same before it is pressed against the types. That is to say, I mount the heater stationarily outside of the mold and beneath the melting box, so that the metal of the block is preliminarily heated or fused before passing to the mold 43, in the carrier J, the latter in this case being moved to and from the melting box. By this means the slug is entirely remelted in the box from which it is transferred by plunger K to the space 43 in the carrier J, which thus becomes a mold or casting box. The molten metal being pressed against the face of the matrix types, a solid line is cast in the usual manner and is then removed from the face of the types by the carrier J.

The melting box may be larger than the mold or casting box so as to contain a supply of metal sufficient to cast one or more bars. The metal is fed into the casting box automatically as a bar is cast, so that the melting box is substantially full at all times or contains sufficient metal to cast a bar of any required size. It will be seen that by this means I dispense entirely with the ordinary melting pot and burner and mechanism used in moving the melting pot to the mold. Thus the operation is greatly simplified and the unnecessary heat and fumes of melted metal is dispensed with.

In order to free the block from the type after the impression, the guide bar is given a drawback movement actuated by the cam 8. The guide bar is of the same construction and this movement is effected by mechanism as in the above mentioned patent. The block carrier is then shifted back to the first described position and the block is ejected into a galley R by the advancing edge of the following block from the magazine. The galley has a step-by-step descending movement, to enable it to receive successive blocks, by means of a vertical toothed rack bar which is engaged by a pivoted escapement R'. The escapement is actuated by a tappet $s^4$ on the cam disk 10.

After forming the type the bodies of the type-bar are brought into line so that the hooks will be in place for proper selective engagement by the distributing mechanism. This involves the relaxing of the hold of the carriage, the disengagement of type-bars from the alining bar $g^2$, and the depression of the type-bars by the depressor o. These operations are effected from a cam 3, the motion being derived from a rock-shaft L as set forth in the above mentioned patent, the motion of the rock-shaft being derived through a crank-arm L', connecting rod $L^2$, and lever $L^3$ on which is the cam-roll.

The distribution of the type-bars and spacers is effected by sliding the hooked ends onto distributer wires M each of which is carried by a pair of levers M', $M^2$. The type-bars and spacers are elevated while hanging from the distributer wires upon operation of a distributer cam 6 and the type-bars presented to the admission ends of their respective chambers in the magazine. The type-bars are transferred from the distributer wires to the magazine wires by a pusher plate N which is actuated by the cam 7 as set forth in the above mentioned patent.

What I claim is:—

1. In a type casting mechanism the combination of a melting box and a mold, with a magazine containing a plurality of bars of type metal, said melting box being of substantially the same capacity as said mold, and automatic mechanism for feeding said bars singly to said melting box and for removing the molten metal therefrom to said mold.

2. In a type casting mechanism the combination of a mold and a melting box, said melting box containing substantially the same quantity of metal as said mold and automatic mechanism for feeding metal bars to said melting box and for removing the molten metal therefrom to said mold.

3. In a type casting mechanism the combination of a receptacle for type metal, means for heating said receptacle to melt said metal, automatic means for feeding said metal to said receptacle, and for ejecting the metal therefrom, said molten metal being ejected from said receptacle by the action of said mechanism upon the solid metal in feeding it into said receptacle.

4. The combination of a receptacle for type metal, electrical means for heating said receptacle, a mold, and automatic mechanism for removing metal from said receptacle to said mold and impressing it against a line of matrix types by the action of said mechanism in feeding metal into the receptacle.

5. In a type casting mechanism, the combination of a magazine containing a plurality of bars of type metal, a receptacle adapted to receive said bars, means for heating said receptacle, means for feeding said bars to said receptacle, and said metal being ejected from said receptacle by the action of said feeding means upon a succeeding bar of metal.

6. In a type casting mechanism the combination of a mold, a receptacle adapted to receive a metal bar, electrical means for heating said receptacle and automatic mechanism for removing said metal from said receptacle to said mold by the action of such mechanism in inserting a new bar in said receptacle.

7. In a type casting mechanism the combination of a magazine for containing a plurality of bars of type metal, a receptacle substantially of the size of one of said bars, means for feeding said bars successively to said receptacle and means for melting said bars independently in said receptacle.

8. The combination of a receptacle adapted to receive type metal, electrical means for heating said receptacle, and automatic means for feeding said metal to said receptacle and for ejecting it therefrom, said molten metal being ejected by the action of the feeding mechanism upon the solid metal.

9. In a type casting mechanism, the combination of a magazine for containing solid metal, a receptacle for melting said metal, a mold, means for feeding solid metal from said magazine directly to said receptacle, and means for removing the molten metal from said receptacle to the mold by the action of said feeding mechanism upon the solid metal.

10. In a type casting mechanism, the combination with a receptacle adapted to receive metal bars, of means for heating said receptacle to melt said bars, a mold, a plunger for feeding said bars to said receptacle and for removing the molten metal therefrom to said mold by the action of said plunger upon a succeeding bar of metal.

11. In a type casting mechanism, a receptacle adapted to receive solid type metal, a mold and type adapted to close said receptacle, means for heating said receptacle to melt said metal, and automatic mechanism for feeding said mechanism to said receptacle and for removing the molten metal therefrom and for impressing it against the types by the action of said feeding mechanism upon the solid metal.

12. In a type casting mechanism, the combination of a magazine containing solid type metal, a mold, means for melting substantially a sufficient quantity of metal to fill said mold and means for feeding said molten metal to said mold by the action of the feeding mechanism on the solid metal.

13. In a type casting mechanism, the combination of a receptacle for solid type metal, electrical means for heating said receptacle, automatic mechanism for feeding said metal to said receptacle, and means for removing it therefrom by the action of said mechanism upon the solid metal.

14. In a type casting mechanism the combination of a receptacle for type metal, electrical means for heating said receptacle, a mold, and automatic mechanism for feeding the solid metal to said receptacle and for removing it therefrom to said mold by the action of said feed mechanism upon the solid metal.

15. In a type casting mechanism the combination of a mold, a melting box, a piston, a magazine for containing metal bars, said piston being adapted to deliver said bars successively to said melting box, and to remove the molten metal therefrom by the action of said piston upon said bars.

16. In a type casting mechanism, the combination of a melting box, a mold and feed mechanism constructed and arranged to deliver solid metal to said melting box and to remove the molten metal therefrom to said mold by the action of said feeding mechanism upon said solid metal.

17. In a type casting mechanism, the combination of a receptacle for type metal, automatic means for closing said receptacle and for opening it to receive said metal, and means for heating said receptacle to melt the metal.

18. In a type casting mechanism a receptacle for type metal, means for heating said receptacle to melt the metal, and a piston so constructed and arranged as to open said receptacle to insert the solid metal therein and to close said receptacle after such insertion.

In testimony whereof I have signed my name to this specification in the presence of two subscribing witnesses.

BYRON A. BROOKS.

Witnesses:
RICHARD B. CAVANAGH,
W. A. PAULING.